(12) United States Patent
Kamishima

(10) Patent No.: US 9,951,700 B2
(45) Date of Patent: Apr. 24, 2018

(54) INTAKE AIR TEMPERATURE ESTIMATION SYSTEM FOR TURBOCHARGED ENGINE

(71) Applicant: TOYOTA JIDOSHA KABUSHIKI KAISHA, Toyota-shi (JP)

(72) Inventor: Hirofumi Kamishima, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/432,558

(22) Filed: Feb. 14, 2017

(65) Prior Publication Data

US 2017/0234248 A1  Aug. 17, 2017

(30) Foreign Application Priority Data

Feb. 16, 2016 (JP) ................. 2016-026873

(51) Int. Cl.
| | | |
|---|---|---|
| *F02D 41/00* | (2006.01) | |
| *F02D 41/26* | (2006.01) | |
| *G01K 13/02* | (2006.01) | |
| *F02D 41/14* | (2006.01) | |

(52) U.S. Cl.
CPC ......... *F02D 41/0007* (2013.01); *F02D 41/26* (2013.01); *G01K 13/02* (2013.01); *F02D 2041/1422* (2013.01); *F02D 2041/1432* (2013.01); *F02D 2200/0406* (2013.01); *F02D 2200/0416* (2013.01); *G01K 2205/02* (2013.01); *Y02T 10/144* (2013.01)

(58) Field of Classification Search
CPC ........... Y02T 10/144; F02D 2041/1422; F02D 2041/1432; F02D 2200/0416

USPC ........... 701/103, 104; 123/559.1, 559.2, 564, 123/689

See application file for complete search history.

(56) References Cited

U.S. PATENT DOCUMENTS

| | | | |
|---|---|---|---|
| 6,286,366 B1* | 9/2001 | Chen ............... | F02D 41/32 73/114.31 |
| 8,731,803 B2* | 5/2014 | Wang ............... | F02D 41/18 123/568.15 |

(Continued)

FOREIGN PATENT DOCUMENTS

| | | |
|---|---|---|
| JP | 3-229952 | 10/1991 |
| JP | 2016-008564 A | 1/2016 |

*Primary Examiner* — Erick Solis

(74) *Attorney, Agent, or Firm* — Oblon, McClelland, Maier & Neustadt, L.L.P.

(57) ABSTRACT

An intake air temperature estimation system includes: an adiabatically compressed intake air temperature computing unit that computes an adiabatically compressed intake air temperature based on an intake air temperature before compression, an intake air pressure before compression and an intake air pressure after compression; and an estimated intake air temperature computing unit that computes an estimated intake air temperature. The estimated intake air temperature computing unit variably sets a coefficient of the function in response to an amount of change per unit time in the intake air pressure after compression such that a followability of the estimated intake air temperature to the adiabatically compressed intake air temperature at the time when the amount of change is large is higher than a followability of the estimated intake air temperature to the adiabatically compressed intake air temperature at the time when the amount of change is small.

6 Claims, 5 Drawing Sheets

(56) References Cited

U.S. PATENT DOCUMENTS

2005/0096833 A1\* 5/2005 Nakazawa .......... F02D 41/0002
  701/102
2012/0290193 A1\* 11/2012 Suzuki ................ F02D 13/0261
  701/103

\* cited by examiner

RATE OF CHANGE ΔP1 IN INTAKE AIR PRESSURE AFTER COMPRESSION P1

AMOUNT OF CHANGE PER UNIT TIME (ABSOLUTE VALUE OF RATE OF CHANGE ΔP1) IN INTAKE AIR PRESSURE AFTER COMPRESSION P1

INTAKE AIR TEMPERATURE ESTIMATION SYSTEM FOR TURBOCHARGED ENGINE

INCORPORATION BY REFERENCE

The disclosure of Japanese Patent Application No. 2016-026873 filed on Feb. 16, 2016 including the specification, drawings and abstract is incorporated herein by reference in its entirety.

BACKGROUND

1. Technical Field

The embodiment relates to an intake air temperature estimation system that is applied to a turbocharged engine including a compressor that compresses intake air and supplies the compressed intake air to a combustion chamber and that estimates the temperature of intake air after compression by the compressor.

2. Description of Related Art

Most of engines, such as vehicle-mounted engines, are provided with an air flow meter and an outside air temperature sensor. The air flow meter detects the volume flow rate of intake air in an intake passage. The outside air temperature sensor detects the temperature of outside air taken into the intake passage. The mass of intake air introduced into a combustion chamber, that is, the amount of air flowing into a cylinder, is obtained from detected results of the air flow meter and outside air temperature sensor.

On the other hand, in a turbocharged engine including a compressor that compresses intake air and supplies the compressed intake air to a combustion chamber, the temperature of intake air rises as the intake air is compressed by the compressor. As the temperature of intake air rises, the density of the intake air decreases. For this reason, in the turbocharged engine, in order to accurately estimate the amount of air flowing into a cylinder, it is required to acquire the temperature of intake air after compression by the compressor.

Conventionally, there is known a system described in Japanese Patent Application Publication No. 03-229952 (JP 03-229952 A) as an intake air temperature estimation system that estimates the temperature of intake air after compression by a compressor in a turbocharged engine. In the system described in JP 03-229952 A, an adiabatically compressed intake air temperature, which is a theoretical intake air temperature after compression by the compressor in an adiabatic state, is obtained from an intake air pressure and intake air temperature before compression by the compressor and an intake air pressure after compression by the compressor. The adiabatically compressed intake air temperature is corrected in response to a change in the intake air temperature due to the influence of engine load and engine rotation speed with the use of a correction coefficient set on the basis of the intake air pressure after compression and the engine rotation speed. Thus, an estimated value of the intake air temperature (estimated intake air temperature) after compression is obtained.

SUMMARY

Incidentally, actual compression of intake air in the compressor is not performed in an adiabatic state, and there is a delay in response of a change in the intake air temperature with respect to a change in the intake air pressure after compression due to, for example, heat exchange with external parts (intake pipe, and the like). For this reason, during the transition in which the intake air pressure after compression changes, the adiabatically compressed intake air temperature deviates from an actual intake air temperature. However, in the existing intake air temperature estimation system for a turbocharged engine, the influence of heat exchange with such external parts is not taken into consideration, so there is a concern about an error in an estimated intake air temperature during the transition.

Of course, if a precise physical model of intake air behavior in an intake system of a turbocharged engine is constructed and then the intake air behavior is reproduced by using the physical model, it is possible to estimate the intake air temperature after compression by the compressor with high accuracy. However, an extremely enormous amount of time and effort are required to construct such a physical model, and a massive amount of computations are required to estimate the intake air temperature with the use of such a physical model.

The embodiment provides an intake air temperature estimation system for a turbocharged engine, which is able to accurately estimate an intake air temperature after compression by a compressor through a simple computation.

An aspect of the embodiment provides an intake air temperature estimation system for a turbocharged engine. The intake air temperature estimation system is applied to a turbocharged engine including a compressor that compresses intake air and supplies the compressed intake air to a combustion chamber, and estimates a temperature of intake air after compression by the compressor. The intake air temperature estimation system includes an adiabatically compressed intake air temperature computing unit. The adiabatically compressed intake air temperature computing unit computes an intake air temperature after compression by the compressor in an adiabatic state as an adiabatically compressed intake air temperature on the basis of an intake air temperature before compression, an intake air pressure before compression and an intake air pressure after compression. The intake air temperature before compression is a temperature of intake air before compression by the compressor. The intake air pressure before compression is a pressure of intake air before compression by the compressor. The intake air pressure after compression is a pressure of intake air after compression by the compressor.

An actual intake air temperature after compression changes with a delay from an adiabatically compressed intake air temperature with respect to a change in the intake air pressure after compression by the compressor because of the influence of heat exchange with external parts, such as an intake pipe. Where a temperature difference between the external parts and intake air is constant, the amount of heat transfer between the external parts and the intake air increases in proportion to time. For this reason, even when the amount of change in the intake air pressure after compression is the same, a delay of an actual intake air temperature after compression from a change in the adiabatically compressed intake air temperature in the case where the change occurs in a short time is shorter than the delay in the case where the change occurs in an extended period of time. That is, a delay of the intake air temperature after compression from the adiabatically compressed intake air temperature is small when a change in the intake air pressure after compression is steep, and the delay is large when a change in the intake air pressure after compression is gentle. Therefore, the delay cannot be simply expressed as a first-order lag model.

On the other hand, the intake air temperature estimation system for a turbocharged engine includes an estimated intake air temperature computing unit that computes an estimated intake air temperature with the use of a function that returns a first-order lag value with respect to the adiabatically compressed intake air temperature. The estimated intake air temperature is an estimated value of the intake air temperature after compression by the compressor. If the function is directly used for computation, a computed estimated intake air temperature is a first-order lag value with respect to the adiabatically compressed intake air temperature. For this reason, during the transition, an estimated intake air temperature deviates from an actual intake air temperature after compression.

In this regard, the estimated intake air temperature computing unit in the intake air temperature estimation system for a turbocharged engine variably sets a coefficient of the function in response to an amount of change per unit time in the intake air pressure after compression such that a followability of the estimated intake air temperature to the adiabatically compressed intake air temperature at the time when the amount of change is large is higher than a followability of the estimated intake air temperature to the adiabatically compressed intake air temperature at the time when the amount of change is small. A delay of the estimated intake air temperature computed in this way from the adiabatically compressed intake air temperature is small when the amount of change per unit time in the intake air pressure after compression is large, that is, when a change in the intake air pressure after compression is steep. The delay from the adiabatically compressed intake air temperature is large when the amount of change per unit time in the intake air pressure after compression is small, that is, when a change in the intake air pressure after compression is gentle. Therefore, as well as the above-described actual intake air temperature after compression, the manner of a delay of the estimated intake air temperature that is computed by the estimated intake air temperature computing unit in this way from the adiabatically compressed intake air temperature varies depending on whether a change in the intake air pressure after compression is steep or gentle. In addition, the function that is used by the estimated intake air temperature computing unit for computation is a simple one that expresses a first-order lag model, and the coefficient of the function is just changed commensurately with a steep or gentle change in the intake air pressure after compression. Therefore, with the intake air temperature estimation system for a turbocharged engine, it is possible to accurately estimate the intake air temperature after compression by the compressor through a simple computation.

Incidentally, since the intake air temperature after compression changes with a delay from the intake air pressure after compression as described above, a change in the intake air temperature after compression with a change in the intake air pressure after compression continues even after the change in the intake air pressure after compression has converged. For this reason, if the followability of the estimated intake air temperature to the adiabatically compressed intake air temperature is immediately decreased at the time when the amount of change per unit time in the intake air pressure after compression reduces, a change in the estimated intake air temperature can delay more than a change in the actual intake air temperature after compression. In contrast, the estimated intake air temperature computing unit in the intake air temperature estimation system for a turbocharged engine may, when the coefficient changes with a reduction in the amount of change per unit time in the intake air pressure after compression, compute the estimated intake air temperature while executing a guard process, the guard process being a process of limiting the amount of change per unit time in the coefficient to a prescribed guard value or lower. When such a guard process is executed, the high followability of the estimated intake air temperature to the adiabatically compressed intake air temperature continues for a while even after a steep change in the intake air pressure after compression has converged. Therefore, it is possible to reduce the above-described delay of the estimated intake air temperature.

If the limitations on the change in the coefficient are continued even after the change in the intake air pressure after compression has converged as a result of the above-described guard process, the computed estimated intake air temperature can converge to a value after the change in the intake air pressure after compression earlier than the actual intake air temperature after compression. In this case, the estimated intake air temperature computing unit may execute the guard process by setting a guard value such that the guard value at the time when the amount of change per unit time in the intake air pressure after compression is large is smaller than the guard value at the time when the mount of change is small. With this configuration, the change in the intake air pressure after compression proceeds toward convergence, and limitations on the amount of change in the coefficient through the guard process are more relaxed as the amount of change per unit time in the intake air pressure after compression reduces. For this reason, it is possible to more quickly cancel limitations on the amount of change in the coefficient through the guard process in response to convergence of a change in the intake air pressure after compression.

On the other hand, generally, an increase in the intake air pressure after compression at the time of acceleration of the turbocharged engine takes more time than a decrease in the intake air pressure after compression at the time of deceleration of the turbocharged engine, so a steep change in the intake air pressure after compression is hard to occur at the time of an increase in the intake air pressure after compression where the intake air temperature after compression rises. For this reason, limitations on the amount of change per unit time in the coefficient through the guard process may be not executed when the adiabatically compressed intake air temperature is rising, and may be executed only when the adiabatically compressed intake air temperature is decreasing.

An increase in the intake air pressure after compression at the time of acceleration of the turbocharged engine or a decrease in the intake air pressure after compression at the time of deceleration of the turbocharged engine is not a monotonous increase or a monotonous decrease. In process of the increase, a temporal decrease in the intake air pressure after compression can occur. In process of the decrease, a temporal increase in the intake air pressure after compression can occur. If the coefficient is changed in response to such a temporal fluctuation in the intake air pressure after compression in process of the change, the computed estimated intake air temperature can respond to the temporal fluctuation sensitively and an instable fluctuation can appear in the computed estimated intake air temperature. In contrast, the estimated intake air temperature computing unit in the intake air temperature estimation system for a turbocharged engine may, when the amount of change per unit time in the intake air pressure after compression is larger than or equal to a prescribed value, variably set the coefficient in response to the amount of change. With this configuration, a dead zone is set such that the coefficient does not change for the amount of change per unit time in the intake air pressure after compression until the amount of change exceeds the prescribed value, so the influence of a temporal fluctuation in the intake air pressure after compression as described above is hard to appear in the computed estimated intake air temperature.

For information, computation of an estimated intake air temperature may be performed in the estimated intake air temperature computing unit in the intake air temperature estimation system for a turbocharged engine by, for example, updating the estimated intake air temperature such that a relationship expressed by the following mathematical expression is satisfied.

$$T1[new] = T1[old] + \frac{T1m - T1[old]}{K}$$

In the above mathematical expression, T1$m$ denotes the adiabatically compressed intake air temperature computed by the adiabatically compressed intake air temperature computing unit, and T1[old] and T1[new] respectively denote the estimated intake air temperature before being updated and the estimated intake air temperature after being updated. In addition, K is a coefficient that takes a value larger than or equal to 1.

In this case, as the coefficient K in the above mathematical expression increases, the followability of the estimated intake air temperature to the adiabatically compressed intake air temperature decreases; whereas, as the coefficient K reduces, the followability of the estimated intake air temperature to the adiabatically compressed intake air temperature increases. For information, when the function that is used by the estimated intake air temperature computing unit to compute the estimated intake air temperature is the above mathematical expression, the coefficient that is variably set by the estimated intake air temperature computing unit in response to the amount of change per unit time in the intake air pressure after compression is the coefficient K in the above mathematical expression.

An aspect of the embodiment may be defined as follows. An aspect of the embodiment provides an intake air temperature estimation system for a turbocharged engine. The turbocharged engine provided with a compressor is configured to compress intake air and supply the compressed intake air to a combustion chamber. The intake air temperature estimation system includes an electronic control unit. The electronic control unit is configured to i) compute an adiabatically compressed intake air temperature on the basis of an intake air temperature before compression, an intake air pressure before compression and an intake air pressure after compression, the intake air temperature before compression being a temperature of intake air before compression by the compressor, the intake air pressure before compression being a pressure of intake air before compression by the compressor, the intake air pressure after compression being a pressure of intake air after compression by the compressor, the adiabatically compressed intake air temperature being a temperature of intake air after compression by the compressor in an adiabatic state, ii) compute an estimated intake air temperature with the use of a function that returns a first-order lag value with respect to the adiabatically compressed intake air temperature, the estimated intake air temperature being an estimated value of the intake air temperature after compression by the compressor, and iii) variably set a coefficient of the function such that a followability of the estimated intake air temperature to the adiabatically compressed intake air temperature at the time when an amount of change per unit time in the intake air pressure after compression is large is higher than a followability of the estimated intake air temperature to the adiabatically compressed intake air temperature at the time when the amount of change per unit time in the intake air pressure after compression is small.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7 is a graph that shows a computed estimated intake air temperature in the embodiment at the time of an increase in the intake air pressure after compression in comparison with an actual intake air temperature, and the like; and FIG. 8 is a graph that shows an estimated intake air temperature in the embodiment at the time of a decrease in the intake air pressure after compression in comparison with an actual intake air temperature, and the like.

DETAILED DESCRIPTION OF EMBODIMENTS

Figure 1:
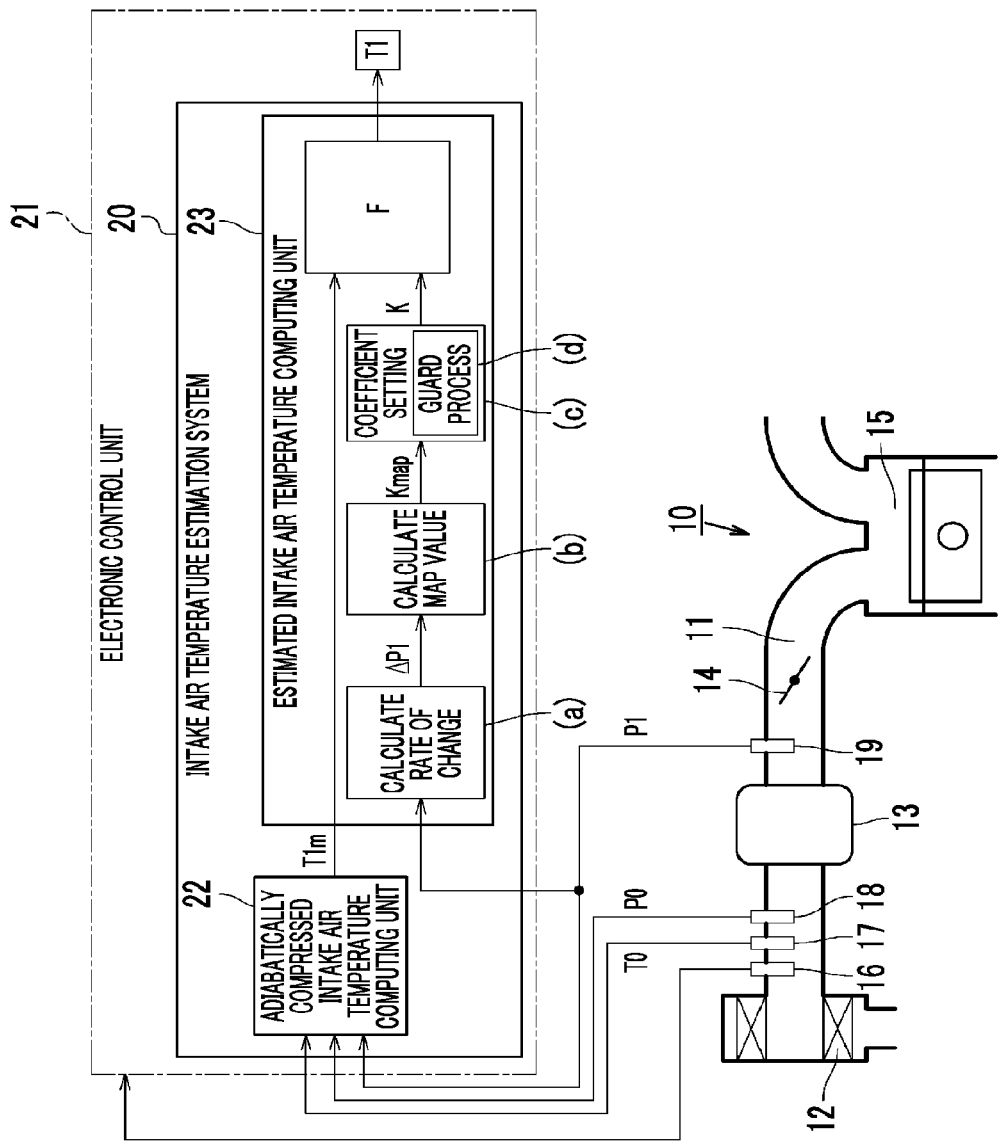
FIG. 1 is a view that schematically shows the configuration of an embodiment of an intake air temperature estimation system for a turbocharged engine and the configuration of the turbocharged engine.

Hereinafter, an embodiment of an intake air temperature estimation system for a turbocharged engine will be described in detail with reference to FIG. 1 to FIG. 8. As shown in FIG. 1, an air cleaner 12 is provided in an intake passage 11 of the turbocharged engine 10. The intake air temperature estimation system 20 according to the present embodiment is applied to the turbocharged engine 10. The air cleaner 12 filters impurities, such as dust, contained in intake air that is taken into the intake passage 11. A compressor 13 is provided in the intake passage 11 at a portion downstream of the air cleaner 12. The compressor 13 is driven by the rotation of a turbine wheel, caused by the stream of exhaust gas from the turbocharged engine 10, or the rotation of a crankshaft that is the output shaft of the turbocharged engine 10 to compress intake air and discharge the compressed intake air to the downstream side of the intake passage 11. A throttle valve 14 is further provided in the intake passage 11 at a portion downstream of the compressor 13. The throttle valve 14 adjusts the volume flow rate of intake air flowing through the intake passage 11 (hereinafter, referred to as intake air flow rate) by changing the flow passage sectional area of the intake passage 11. The downstream end of the intake passage 11 is connected to a combustion chamber 15 of the turbocharged engine 10.

Three sensors, that is, an air flow meter 16, a temperature sensor 17 and a first pressure sensor 18, are provided in the intake passage 11 at a portion between the air cleaner 12 and the compressor 13. A second pressure sensor 19 is provided in the intake passage 11 at a portion between the compressor 13 and the throttle valve 14. The air flow meter 16 detects the above-described intake air flow rate. The temperature sensor 17 detects the temperature of intake air before compression by the compressor 13 (hereinafter, referred to as intake air temperature before compression T0). The first pressure sensor 18 detects the pressure of intake air before compression by the compressor 13 (hereinafter, referred to as intake air pressure before compression P0). The second pressure sensor 19 detects the pressure of intake air after compression by the compressor 13 (hereinafter, referred to as intake air pressure after compression P1).

The intake air temperature estimation system 20 according to the present embodiment is provided in an electronic control unit (ECU) that governs control over the turbocharged engine 10. The intake air temperature estimation system 20 estimates the temperature of intake air after compression (hereinafter, referred to as intake air temperature after compression) by the compressor 13 from detected results of the temperature sensor 17, first pressure sensor 18 and second pressure sensor 19. The electronic control unit 21 uses the intake air temperature after compression, estimated by the intake air temperature estimation system 20, for various controls over the turbocharged engine 10. For example, the electronic control unit 21 obtains the mass of intake air introduced into the combustion chamber 15 (cylinder inflow air mass) on the basis of the intake air flow rate detected by the air flow meter 16 and the intake air temperature after compression, estimated by the intake air temperature estimation system 20 (hereinafter, referred to as estimated intake air temperature T1). The electronic control unit 21 determines the mass of fuel that is supplied to the combustion chamber 15 on the basis of the cylinder inflow air mass such that the weight ratio of the mass of fuel to the cylinder inflow air mass is appropriate, and then controls the amount of fuel that is supplied to the turbocharged engine 10.

The intake air temperature estimation system 20 includes two computing units, that is, an adiabatically compressed intake air temperature computing unit 22 and an estimated intake air temperature computing unit 23. The intake air temperature estimation system 20 computes the estimated intake air temperature T1 in each prescribed operation cycle through a process that is executed by these two computing units 22, 23.

The adiabatically compressed intake air temperature computing unit 22 computes an adiabatically compressed intake air temperature T1$m$. The adiabatically compressed intake air temperature T1$m$ is a theoretical intake air temperature after compression at the time when intake air is quasi-statically compressed by the compressor 13 in an adiabatic state, that is, at the time when a change in the intake air temperature after compression with respect to a change in the intake air pressure after compression P1 is a complete adiabatic change. The adiabatically compressed intake air temperature T1$m$ is computed on the basis of detected values of the intake air temperature before compression T0, intake air pressure before compression P0 and intake air pressure after compression P1 such that the relationship expressed by the following mathematical expression (1) holds. In the following mathematical expression (1), A, B are constants determined in response to the physical characteristic of air.

$$T1m = \left(A \times \frac{P1}{P0} + B\right) \times T0 \quad (1)$$

The estimated intake air temperature computing unit 23 computes the estimated intake air temperature T1 on the basis of the thus computed adiabatically compressed intake air temperature T1$m$. Computation of the estimated intake air temperature T1 is performed by updating the estimated intake air temperature T1 in each above-described operation cycle such that the relationship expressed by the following mathematical expression (2) holds. In the following mathematical expression (2), T1[old] is the estimated intake air temperature T1 before being updated, and T1[new] is the estimated intake air temperature after being updated. In the following mathematical expression (2), K is a coefficient that takes a value larger than or equal to 1.

$$T1[\text{new}] = T1[\text{old}] + \frac{T1m - T1[\text{old}]}{K} \quad (2)$$

According to the relationship expressed by the above mathematical expression (2), the estimated intake air temperature T1 is increased at each update by a value obtained by dividing a difference of the value (T1[old]) of the estimated intake air temperature T1 before being updated from the adiabatically compressed intake air temperature T1$m$ by the coefficient K. In computing the initial estimated intake air temperature T1 after a start of the turbocharged engine 10, the adiabatically compressed intake air temperature T1$m$ is directly set to the estimated intake air temperature T1.

In the above mathematical expression (2), when the coefficient K is 1, the estimated intake air temperature T1 after being updated is always the same value as the adiabatically compressed intake air temperature T1$m$ irrespective of the estimated intake air temperature T1 before being updated. That is, a delay (time constant) of the computed estimated intake air temperature T1 from the adiabatically compressed intake air temperature T1$m$ at this time is zero. On the other hand, when the coefficient K is increased from 1, a delay (time constant) of the computed estimated intake air temperature T1 from the adiabatically compressed intake air temperature T1$m$ gradually increases. In this way, in the above mathematical expression (2), the coefficient K is a coefficient that determines the followability of the estimated intake air temperature T1 to the adiabatically compressed intake air temperature T1$m$.

When the coefficient K is constant, the above mathematical expression (2) becomes a function F that returns a first-order lag value with respect to the adiabatically compressed intake air temperature T1$m$ as the estimated intake air temperature T1. Therefore, computation of the estimated intake air temperature T1 by the estimated intake air temperature computing unit 23 is performed with the use of the function F that returns the first-order lag value with respect to the adiabatically compressed intake air temperature T1$m$.

However, in the present embodiment, the coefficient K is not a constant but a variable that changes with the amount of change per unit time in the intake air pressure after compression P1. The coefficient K is set through the following processes (a) to (c). That is, in setting the coefficient K, the estimated intake air temperature computing unit 23 initially (a) calculates the rate of change ΔP1 in the intake air pressure after compression P1. Subsequently, the estimated intake air temperature computing unit 23 (b) calculates a map value Kmap of the coefficient K on the basis of the rate of change ΔP1. The estimated intake air temperature computing unit 23 (c) sets the coefficient K on the basis of the map value Kmap. In setting the coefficient K at this time, (d) a guard process that limits the amount of change per unit time in the coefficient K is executed as needed.

In the process (a), a value obtained by subtracting a detected value of the intake air pressure after compression P1, acquired in the last operation cycle, from a detected value of the intake air pressure after compression P1, acquired in this operation cycle, is calculated as the rate of change ΔP1 in the intake air pressure after compression P1. The rate of change ΔP1 is negative when the intake air pressure after compression P1 is reducing. The absolute value of the rate of change ΔP1 indicates the amount of change per unit time in the intake air pressure after compression P1 where the operation cycle is set to the unit time. Other than these, the rate of change ΔP1 may be obtained with another method. For example, the inclination of the moving average line of the intake air pressure after compression P1, acquired in each operation cycle, is obtained, and the inclination is set for the rate of change ΔP1.

Calculation of the map value Kmap in the process (b) is performed by consulting a map stored in advance. This map stores the relationship between a rate of change ΔP1 and a map value Kmap.

Figure 2:
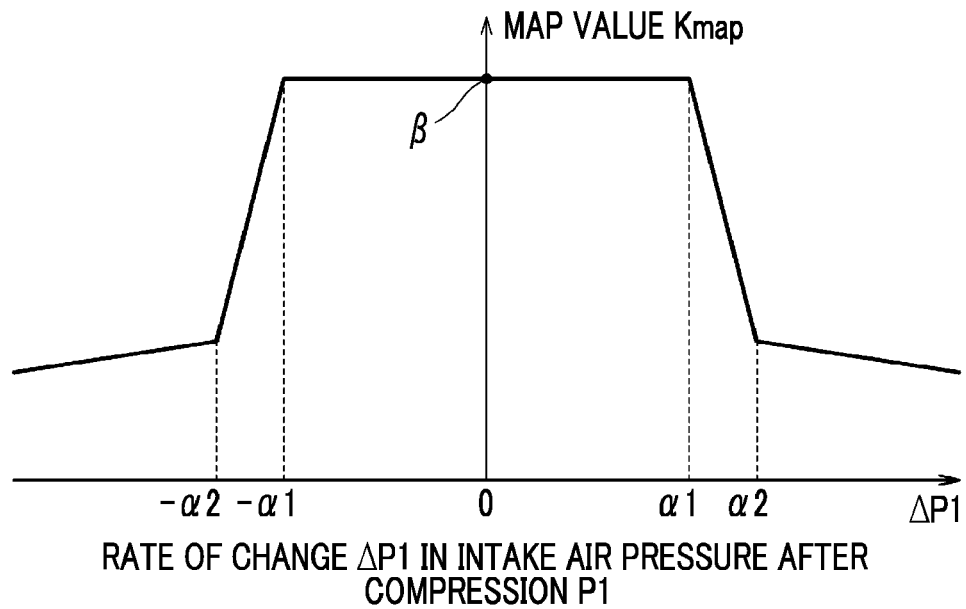
FIG. 2 is a graph that shows the relationship between a map value of a coefficient that is used to compute an estimated intake air temperature and a rate of change in intake air pressure after compression in the embodiment.

As shown in FIG. 2, the map value Kmap is a constant value 13 within the range in which the absolute value of the rate of change ΔP1 is smaller than a prescribed value α1. When the absolute value of the rate of change ΔP1 is increased beyond α1, the map value Kmap gradually reduces from β. Within the range in which the absolute value of the rate of change ΔP1 exceeds α1 and reaches a prescribed value α2 (>α1), the map value Kmap is steeply reducing with an increase in the absolute value of the rate of change ΔP1. Within the range in which the absolute value of the rate of change ΔP1 exceeds α2, a reduction in the map value Kmap with an increase in the absolute value of the rate of change ΔP1 is much gentler.

In setting the coefficient K in the process (c), when one or more of the following conditions (i) to (iii) are not satisfied, the map value Kmap is directly set for the coefficient K.
(i) The coefficient K is changed with a reduction in the amount of change per unit time (the absolute value of the rate of change ΔP1) in the intake air pressure after compression P1. That is, the coefficient K is in process of changing such that the followability of the estimated intake air temperature T1 to the adiabatically compressed intake air temperature T1$m$ increases. In the present embodiment, as shown in FIG. 2, a change in the map value Kmap resulting from a reduction in the amount of change per unit time (the absolute value of the rate of change ΔP1) in the intake air pressure after compression P1 is a change toward an increasing side. In response to an increase in the map value Kmap at this time, the coefficient K also increases.
(ii) The adiabatically compressed intake air temperature T1$m$ is decreasing.
(iii) When the map value Kmap is directly set for the coefficient K, the amount of change ΔK in the coefficient K from the last operation cycle exceeds a guard value ΔKmax.

In contrast, when all the above conditions (i) to (iii) are satisfied, the above-described guard process (d) is executed, and the coefficient K is set to a value at which the amount of change ΔK from the coefficient K set in the last operation cycle (hereinafter, referred to as last coefficient Kold) becomes the guard value ΔKmax. In the thus configured guard process, the amount of change ΔK in the coefficient K from the last operation cycle, that is, the amount of change ΔK per unit time in the coefficient K where the operation cycle is set to a unit time, is limited to the guard value ΔKmax or below.

Figure 3:
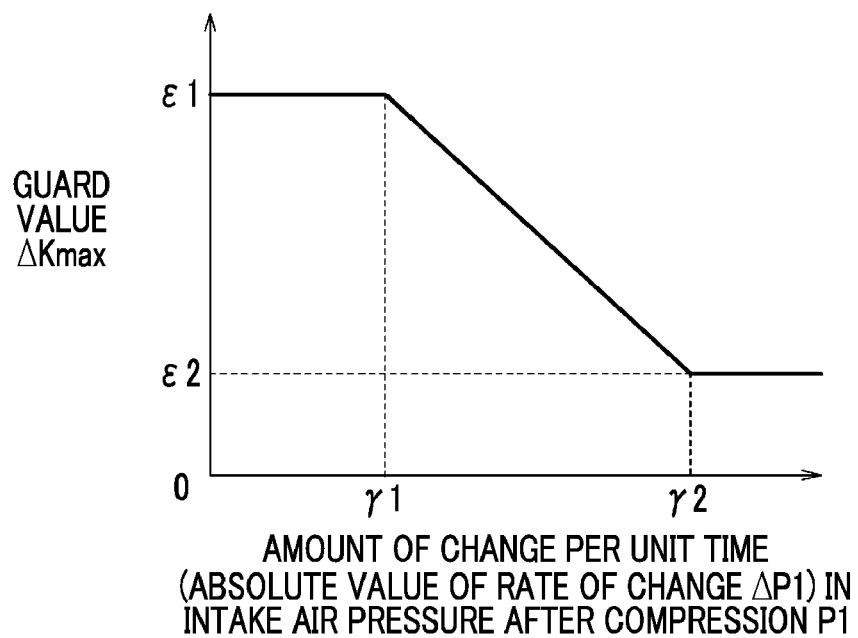
FIG. 3 is a graph that shows the relationship between a guard value that is set in a guard process and a rate of change in intake air pressure after compression.

As shown in FIG. 3, the guard value ΔKmax is a variable that changes with the amount of change per unit time (the absolute value of the rate of change ΔP1) in the intake air pressure after compression P1. That is, the guard value ΔKmax is set to a maximum set value ϵ1 when the absolute value of the rate of change ΔP1 is smaller than or equal to a prescribed value γ1, and is set to a minimum set value ϵ2 (<ϵ1) when the absolute value of the rate of change ΔP1 is larger than or equal to a prescribed value γ2 (>γ1). When the absolute value of the rate of change ΔP1 ranges from γ1 to γ2, the guard value ΔKmax is set so as to reduce from ϵ1 to ϵ2 at a constant ratio with an increase in the absolute value of the rate of change ΔP1.

As described above, in the function F that is used to compute the estimated intake air temperature T1, the estimated intake air temperature computing unit 23 variably sets the coefficient K in response to the amount of change per unit time (the absolute value of the rate of change ΔP1) in the intake air pressure after compression P1. The coefficient K determines the followability of the estimated intake air temperature T1 to the adiabatically compressed intake air temperature T1$m$. That is, the estimated intake air temperature computing unit 23 uses the coefficient K that is originally a constant but set as a variable in computing the estimated intake air temperature T1 in the above-described function F that returns a first-order lag value with respect to the adiabatically compressed intake air temperature T1$m$.

Figure 4:
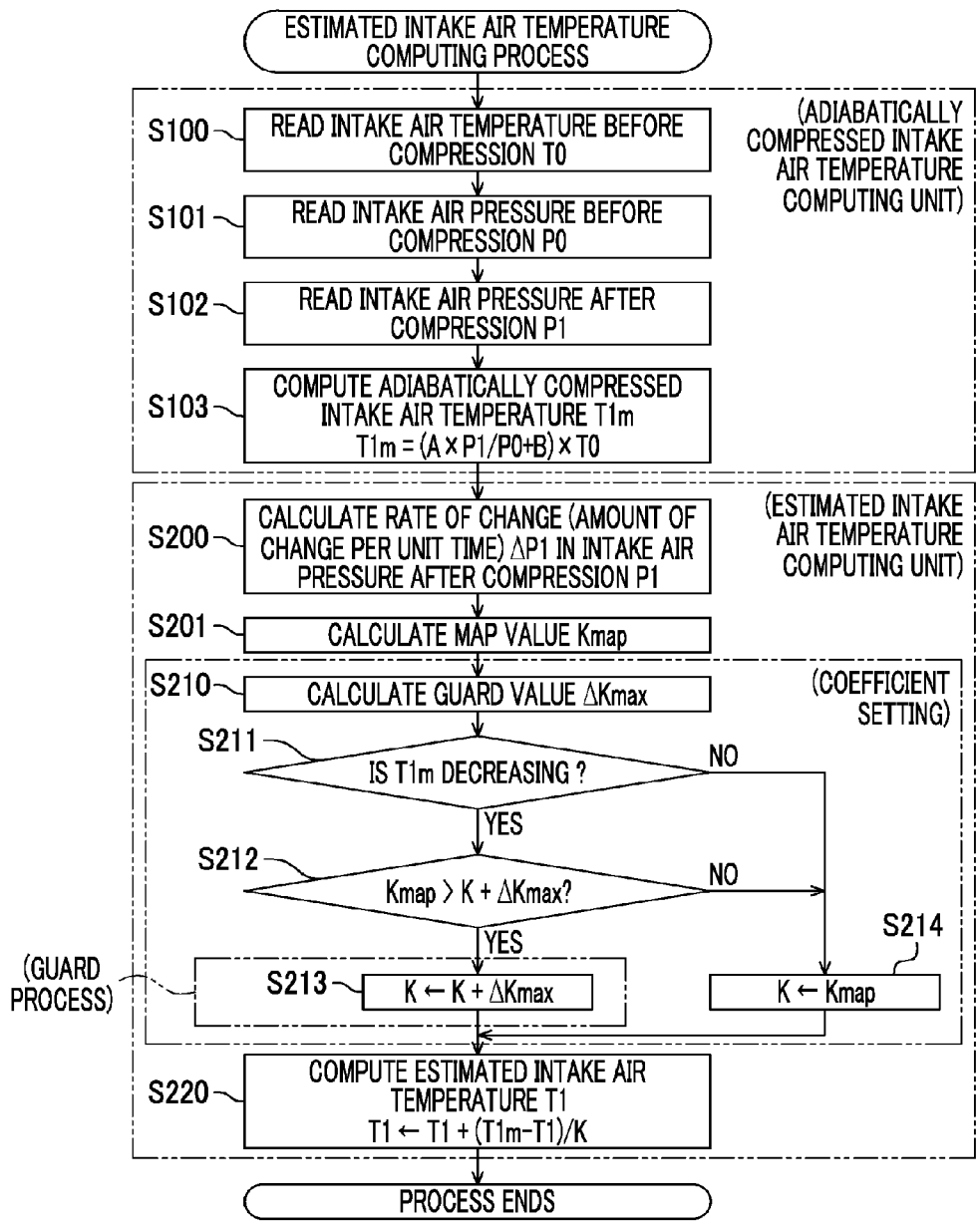
FIG. 4 is a flowchart that shows the procedure of a process of computing an estimated intake air temperature in the embodiment.

FIG. 4 shows a flowchart of a process of computing the estimated intake air temperature T1 in the intake air temperature estimation system 20. In the intake air temperature estimation system 20, the process of the above routine is repeatedly executed in each prescribed operation cycle. This flowchart expresses processes that are executed by the adiabatically compressed intake air temperature computing unit 22 and the estimated intake air temperature computing unit 23 in each operation cycle as a series of processes. Specifically, the processes of step S100 to step S103 in the flowchart are executed by the adiabatically compressed intake air temperature computing unit 22, and the processes of step S200 to step S220 are executed by the estimated intake air temperature computing unit 23. The processes of step S210 to step S214 correspond to the process (c) of setting the coefficient K.

When the process of the routine is started, initially, detected values of the intake air temperature before compression T0, intake air pressure before compression P0 and intake air pressure after compression P1 are read in step S100 to step S102. In step S103, the adiabatically compressed intake air temperature T1$m$ is computed in accordance with the above mathematical expression (1) on the basis of the read detected values.

Subsequently, in step S200, the rate of change ΔP1 in the intake air pressure after compression P1 is calculated. In the next step S201, the map value Kmap is calculated on the basis of the rate of change ΔP1.

In the next step S210, the guard value ΔKmax is calculated on the basis of the rate of change ΔP1. Subsequently, in step S211, it is determined whether the adiabatically compressed intake air temperature T1$m$ is decreasing, that is, whether the above-described condition (ii) is satisfied. When the adiabatically compressed intake air temperature T1$m$ is decreasing (YES), the process proceeds to step S212. When the adiabatically compressed intake air temperature T1$m$ is not decreasing (NO), the process proceeds to step S214. In the present embodiment, on the ground that the adiabatically compressed intake air temperature T1$m$ computed in this operation cycle is smaller (lower in temperature) than the adiabatically compressed intake air temperature T1$m$ computed in the last operation cycle, it is determined that the adiabatically compressed intake air temperature T1$m$ is decreasing. Other than this, this determination may be made with the use of another method. For example, the inclination of the moving average line of the adiabatically compressed intake air temperature T1$m$ computed in each operation cycle is obtained, and it is determined whether the adiabatically compressed intake air temperature T1$m$ is decreasing on the basis of the inclination.

When the process proceeds to step S212, it is determined in step S212 whether the map value Kmap calculated in step S201 exceeds the sum of the current coefficient K and the guard value ΔKmax calculated in step S210. When the map value Kmap exceeds the sum (YES), the process proceeds to step S213. When the map value Kmap does not exceed the sum (NO), the process proceeds to step S214.

In step S212, it is determined whether the above-described conditions (i) and (iii) both are satisfied. At the time when the process proceeds to step S212 in this routine, the coefficient K is not operated, and the coefficient K at this time is a value set at the time when the routine is executed in the last operation cycle, that is, the above-described last coefficient Kold.

On the other hand, as shown in FIG. 2, the map value Kmap changes only toward an increasing side in response to a reduction in the amount of change per unit time (the absolute value of the rate of change ΔP1) in the intake air pressure after compression P1. When the map value Kmap is increasing, the coefficient K also increases within the range not exceeding the map value Kmap. Thus, when the coefficient K is changing (increasing) with a reduction in the amount of change per unit time (the absolute value of the rate of change ΔP1) in the intake air pressure after compression P1, that is, when the above-described condition (i) is satisfied, the relationship (I) Kmap>Kold holds.

In contrast, in the case where the map value Kmap is directly set for the coefficient K, when the amount of change ΔK in the coefficient K from the last operation cycle exceeds the guard value ΔKmax, that is, when the above-described condition (iii) is satisfied, there is a case where the relationship (II) Kmap >Kold+ΔKmax holds or a case where the relationship (III) Kmap<Kold−ΔKmax holds. When the relationship (II) holds, the relationship (I) definitely holds; whereas, when the relationship (III) holds, the relationship (I) definitely does not hold. Thus, on the ground that the relationship (II) holds, that is, affirmative determination is made in step S212, it is allowed to be determined that the conditions (i) and (iii) both are satisfied.

As a result of the above-described processes, when the process proceeds to step S213, the sum of the current coefficient K and the guard value ΔKmax is set as a new coefficient K in step S213, and then the process proceeds to step S220. That is, in step S213, the guard process (d) is executed.

In contrast, when the process proceeds to step S214, the map value Kmap calculated in step S201 is set as the coefficient K in step S214, and then the process proceeds to step S220.

When the process proceeds to step S220, the estimated intake air temperature T1 is computed in step S220 in accordance with the above mathematical expression (2) on the basis of the adiabatically compressed intake air temperature T1$m$ computed in step S103 and the coefficient K set in step S213 or step S214. After computation of the estimated intake air temperature T1, the process of the routine in this operation cycle is ended.

In the turbocharged engine 10 as shown in FIG. 1, intake air taken into the intake passage 11 is compressed by the compressor 13, and is fed to the combustion chamber 15. The temperature of intake air rises as a result of compression at the compressor 13 at this time. Therefore, the temperature of intake air flowing into the combustion chamber 15 becomes a temperature that has risen as a result of compression at the compressor 13, that is, the above-described intake air temperature after compression.

As the intake air pressure after compression P1 changes as a result of acceleration or deceleration of the turbocharged engine 10, the intake air temperature after compression also changes. However, as the intake air temperature after compression changes, there occurs a temperature difference between intake air and external parts (the casing of the compressor 13, the intake pipe, and the like), with the result that heat transfers between intake air after compression and the external parts. Thus, a change in the intake air temperature after compression at this time is not a complete adiabatic change, and there is a delay in the change in the intake air temperature after compression from the change in the intake air pressure after compression P1. That is, an actual intake air temperature after compression also changes with a delay from the adiabatically compressed intake air temperature T1$m$ computed on the assumption that the change in the intake air temperature after compression in response to the change in the intake air pressure after compression P1 is a complete adiabatic change. A delay of the intake air temperature after compression from the adiabatically compressed intake air temperature T1$m$ at this time is small when the change in the intake air pressure after compression P1 is steep, and is large when the change in the intake air pressure after compression P1 is gentle. For this reason, the delay cannot be simply expressed as a first-order lag model.

The case where the estimated intake air temperature T1 is computed on the assumption that the coefficient K in the above mathematical expression (2) is a constant will be considered. As described above, where the coefficient K is a constant, the above mathematical expression (2) is the function F that returns the first-order lag value with respect to the adiabatically compressed intake air temperature T1$m$, that is, the intake air pressure after compression P1, as the estimated intake air temperature T1. In this case, if the coefficient is set so as to be adapted to the case where a change in the intake air pressure after compression P1 is steep, when the change is gentle, the computed estimated intake air temperature T1 changes earlier than an actual intake air temperature after compression. On the other hand, if the coefficient K is set so as to be adapted to the case where the change is gentle, when the change is steep, the computed estimated intake air temperature T1 changes later than an actual intake air temperature after compression.

In contrast, in the intake air temperature estimation system 20 according to the present embodiment, the estimated intake air temperature computing unit 23 variably sets the coefficient K in response to the amount of change per unit time (the absolute value of the rate of change ΔP) in the intake air pressure after compression P1, and then computes the estimated intake air temperature T1. As shown in FIG. 2, the coefficient K at the time when the amount of change per unit time (the absolute value of the rate of change ΔP1) in the intake air pressure after compression P1 is large is set to a smaller value than the coefficient K at the time when the amount of change is small. As described above, when the coefficient K is increased from 1, a delay (time constant) of the computed estimated intake air temperature T1 from the adiabatically compressed intake air temperature T1m gradually increases. Thus, as the coefficient K is reduced, the followability of the estimated intake air temperature T1 to the adiabatically compressed intake air temperature T1m increases. That is, a delay of the estimated intake air temperature T1 from the adiabatically compressed intake air temperature T1m reduces.

A delay of the estimated intake air temperature T1 computed by the estimated intake air temperature computing unit 23 from the adiabatically compressed intake air temperature T1m is small when the amount of change per unit time in the intake air pressure after compression P1 is large, that is, when a change in the intake air pressure after compression P1 is steep. When the amount of change per unit time in the intake air pressure after compression P1 is small, that is, when a change in the intake air pressure after compression P1 is gentle, a delay from the adiabatically compressed intake air temperature T1m increases. Therefore, as well as the above-described actual intake air temperature after compression, the manner of a delay of the estimated intake air temperature T1 computed by the estimated intake air temperature computing unit 23 from the adiabatically compressed intake air temperature T1m varies depending on whether a change in the intake air pressure after compression P1 is steep or gentle. In addition, the function F that is used by the estimated intake air temperature computing unit 23 for computation is a simple one that expresses a first-order lag model, and the coefficient K of the function F is just changed commensurately with a steep or gentle change in the intake air pressure after compression P1. Therefore, with the intake air temperature estimation system 20 according to the present embodiment, it is possible to accurately estimate the intake air temperature after compression by the compressor 13 through a simple computation.

However, if a value (map value Kmap) calculated from the amount of change per unit time (the absolute value of the rate of change ΔP1) in the intake air pressure after compression P1 is directly set for the coefficient K, the following inconvenience can occur.

Figure 5:
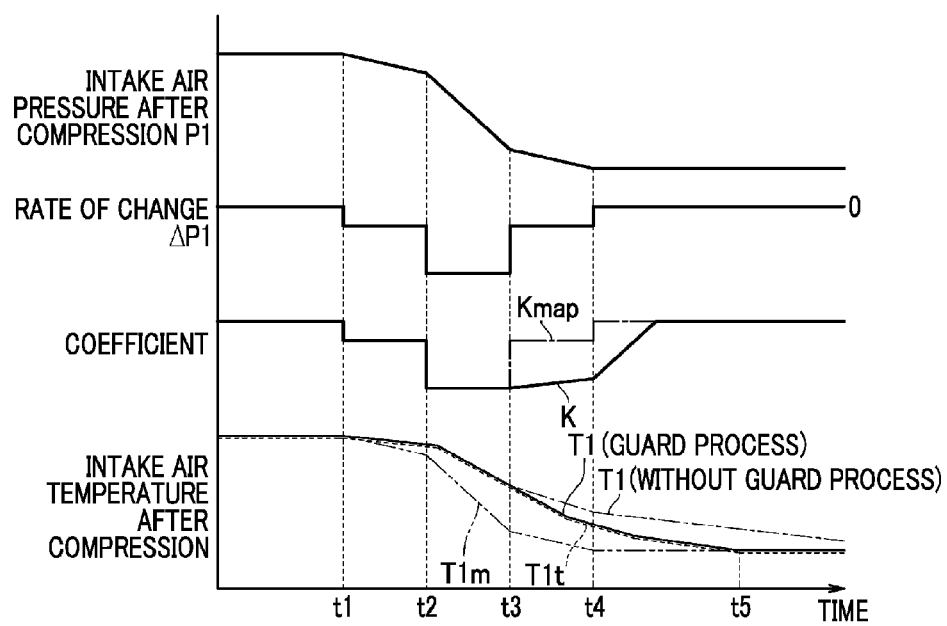
FIG. 5 is a timing chart that schematically shows changes in rate of change, coefficient, map value, adiabatically compressed intake air temperature, actual intake air temperature after compression, and the like, at the time of a decrease in the intake air pressure after compression in the embodiment.

FIG. 5 schematically shows changes in the rate of change ΔP1, coefficient K, map value Kmap, adiabatically compressed intake air temperature T1m, actual intake air temperature after compression (hereinafter, referred to as actual intake air temperature T1t), and the like, at the time of a decrease in the intake air pressure after compression P1. In FIG. 5, the intake air pressure after compression P1 decreases from time t1 to time t4, in which a decrease in the intake air pressure after compression P1 in the period from t2 to t3 is steeper than the decrease in the period from t1 to t2 that is before the period from t2 to t3 or the decrease in the period from t3 to t4 that is after the period from t2 to t3. That is, the amount of change per unit time (the absolute value of the rate of change ΔP1) in the intake air pressure after compression P1 in the period from t2 to t3 is larger than the amount of change in the period from t1 to t2 or the amount of change in the period from t3 to t4.

As described above, a delay of the actual intake air temperature T1 at this time is small for a steep change in the intake air pressure after compression P1, and is large for a gentle change. However, a change in such a delay of the actual intake air temperature T1t appears after a lapse of a slight time from a change in the rate of change in the intake air pressure after compression P1.

On the other hand, the map value Kmap is immediately increased as the amount of change per unit time (the absolute value of the rate of change ΔP1) in the intake air pressure after compression P1 reduces. For this reason, the above-described guard process is not executed, and, when the estimated intake air temperature T1 is computed by directly setting the map value Kmap for the coefficient K, a decrease in the thus computed estimated intake air temperature T1 is slower than that in the actual intake air temperature T1t as indicated by the alternate long and short dashes line in the timing chart.

In contrast, in the present embodiment, when the coefficient K changes toward an increasing side with a reduction in the absolute value of the rate of change ΔP1, the guard process is executed. In the guard process, the amount of change per unit time in the coefficient K is limited to the guard value ΔKmax or below. For this reason, even after time t3 at which a steep change in the intake air pressure after compression P1 has converged, the state where a small value is set for the coefficient K and, by extension, the state where the followability of the estimated intake air temperature T1 to the adiabatically compressed intake air temperature T1m is high, continues for a while. Therefore, the computed estimated intake air temperature T1 is further approximate to the behavior of the actual intake air temperature T1t.

If the limitations on the change in the coefficient K is continued even after a change in the intake air pressure after compression P1 has converged as a result of the above-described guard process, the computed estimated intake air temperature T1 can converge to a value after a change in the intake air pressure after compression P1 earlier than the actual intake air temperature T1t. That is, the computed estimated intake air temperature T1 converges at the timing earlier than time t5 at which the actual intake air temperature T1t converges to a value after a change in the intake air pressure after compression P1. In this regard, in the present embodiment, as shown in FIG. 3, the guard value ΔKmax at the time when the amount of change per unit time (the absolute value of the rate of change ΔP1) in the intake air pressure after compression P1 is large is set to a larger value than the guard value ΔKmax at the time when the amount of change is small.

In this case, a change in the intake air pressure after compression P1 proceeds toward convergence, and limitations on the amount of change in the coefficient K through the guard process are more relaxed as the amount of change per unit time in the intake air pressure after compression P1 reduces. For this reason, it is possible to cancel the limitations on the amount of change in the coefficient K through the guard process more quickly in response to convergence of a change in the intake air pressure after compression P1.

Figure 6:
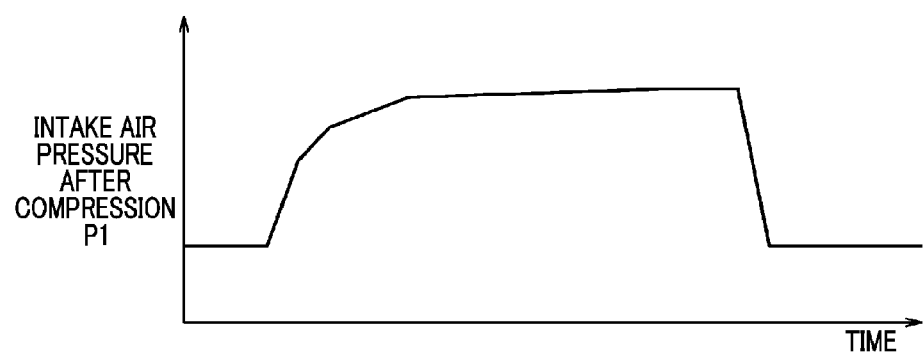
FIG. 6 is a graph that shows changes in the intake air pressure after compression when the turbocharged engine accelerates and then decelerates.

As shown in FIG. 6, it takes more time to increase the intake air pressure after compression P1 at the time of acceleration of the turbocharged engine 10 than to decrease the intake air pressure after compression P1 at the time of deceleration of the turbocharged engine 10. For this reason, at the time of an increase in the intake air pressure after compression P1 where the intake air temperature after compression increases, it is possible to approximate the computed estimated intake air temperature T1 to the actual intake air temperature T1t even when the amount of change per unit time in the coefficient K is not limited with the use of the guard value ΔKmax in the guard process. Then, in the present embodiment, in order to further reduce a load in computing the estimated intake air temperature T1, in the guard process, the amount of change per unit time in the coefficient K is not limited when the adiabatically compressed intake air temperature T1m is rising, and is limited only when the adiabatically compressed intake air temperature T1m is decreasing.

An increase in the intake air pressure after compression P1 at the time of acceleration of the turbocharged engine 10 or a decrease in the intake air pressure after compression P1 at the time of deceleration of the turbocharged engine 10 is not a monotonous increase or a monotonous decrease. In process of the increase, a temporal decrease in the intake air pressure after compression P1 can occur. In process of the decrease, a temporal increase in the intake air pressure after compression P1 can occur. If the coefficient is changed in response to such a temporal fluctuation in the intake air pressure after compression P1, the computed estimated intake air temperature T1 can respond to the temporal fluctuation and an instable fluctuation can appear in the computed estimated intake air temperature T1. In this regard, in the present embodiment, as shown in FIG. 2, in the range in which the amount of change per unit time (the absolute value of the rate of change ΔP1) in the intake air pressure after compression P1 is smaller than or equal to α1, the map value Kmap is set to the constant value β, and a dead zone is set. In the dead zone, the coefficient K remains unchanged, and the coefficient K does not change in response to the amount of change. For this reason, the influence of a temporal fluctuation in the intake air pressure after compression P1 is hard to appear as described above in the computed estimated intake air temperature T1.

Figure 7:
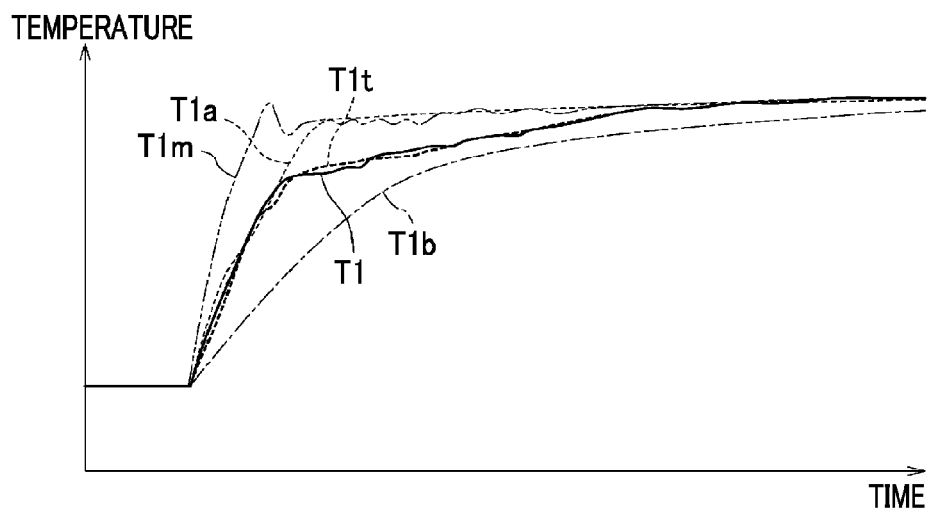
Figure 8:
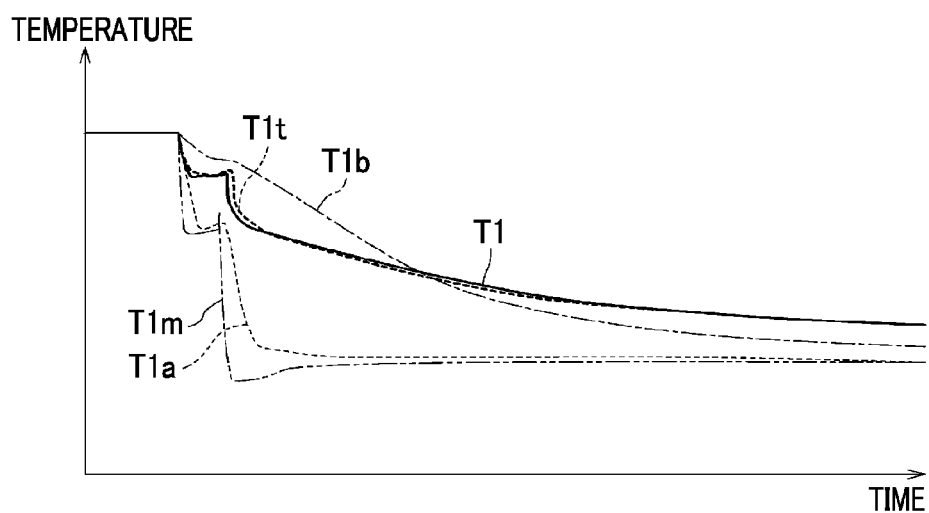

FIG. 7 shows changes in the adiabatically compressed intake air temperature T1m, computed estimated intake air temperature T1 and actual intake air temperature T1t at the time of an increase in the intake air pressure after compression P1, resulting from acceleration of the turbocharged engine 10. FIG. 8 shows changes in the adiabatically compressed intake air temperature T1m, computed estimated intake air temperature T1 and actual intake air temperature T1t at the time of a decrease in the intake air pressure after compression P1, resulting from deceleration of the turbocharged engine 10. FIG. 7 and FIG. 8 additionally show changes in computed estimated intake air temperature T1a in the case where the coefficient K is fixed to a value that is adapted to the case where the intake air pressure after compression P1 is steeply changing and changes in computed estimated intake air temperature T1b in the case where the coefficient K is fixed to a value that is adapted to the case where the intake air pressure after compression P1 is gently changing together as comparative examples.

As described above, a delay of the actual intake air temperature T1t from the adiabatically compressed intake air temperature T1m changes depending on whether a change in the adiabatically compressed intake air temperature T1m, that is, a change in the intake air pressure after compression P1, is steep or gentle. Therefore, if the coefficient K is set to a constant value, there is a case where such a change in the delay cannot be met. Therefore, as shown in FIG. 7 and FIG. 8, the trajectories of the computed estimated intake air temperatures T1a, T1b in the case where the coefficient K is fixed both significantly deviate from the trajectory of the actual intake air temperature T1t. In contrast, the trajectory of the computed estimated intake air temperature T1 in the intake air temperature estimation system 20 according to the present embodiment, which is configured to variably set the coefficient K in response to the amount of change per unit time in the intake air pressure after compression P1, is approximated to the trajectory of the actual intake air temperature T1t.

The above-described embodiment may be modified into the following alternative embodiments. In the above-described embodiment, when the amount of change per unit time (the absolute value of the rate of change ΔP1) in the intake air pressure after compression P1 is smaller than α1, the coefficient K is fixed to β, and the coefficient K is gradually reduced from β as the amount of change increases beyond α1. That is, in the above-described embodiment, the dead zone is set. In the dead zone, the coefficient K remains unchanged in response to the amount of change until the amount of change reaches a certain magnitude. Thus, the influence of a temporal fluctuation in process of the change in the intake air pressure after compression P1 is hard to appear in the computed estimated intake air temperature T1. Such a dead zone is not set but the coefficient K may be variably set in response to the amount of change over all the range of the amount of change.

In the case of selecting not to set the above-described dead zone, when the influence of a temporal fluctuation in the intake air pressure after compression P1 in process of the change on the computed estimated intake air temperature T1 is not ignorable, the following manner may be employed. That is, a detected value of the intake air pressure after compression P1 or the calculated amount of change per unit time in the intake air pressure after compression P1 is subjected to filtering, and the temporal fluctuation is smoothed in advance. With this manner, even when the above-described dead zone is not set, the influence of a temporal fluctuation in the intake air pressure after compression P1 is hard to appear in the computed estimated intake air temperature T1.

In the above-described embodiment, the guard process is not executed when the adiabatically compressed intake air temperature T1m is rising but is executed only when the adiabatically compressed intake air temperature T1m is decreasing. Instead, the guard process may be executed when the adiabatically compressed intake air temperature T1m is rising as well. For example, when the procedure of the flowchart is modified such that the process of step S211 in the flowchart of FIG. 4 is omitted and the process proceeds to step S212 after the process of step S210, the guard process is also executed when the adiabatically compressed intake air temperature T1m is rising.

In the above-described embodiment, the guard value ΔKmax of the guard process is set to a larger value as the amount of change per unit time (the absolute value of the rate of change ΔP1) in the intake air pressure after compression P1 increases. Thus, limitations on the amount of change in the coefficient K through the guard process are more relaxed as the change in the intake air pressure after compression P1 proceeds toward convergence. Instead of reducing the guard value ΔKmax with a reduction in the amount of change per unit time in the intake air pressure after compression P1, limitations on the amount of change per unit time in the coefficient K through the guard process may be cancelled at the time when the amount of change per unit time in the intake air pressure after compression P1 has decreased to a set value. With this manner, limitations on the amount of change in the coefficient K through the guard process are reliably cancelled at the time when the change in the intake air pressure after compression P1 has converged to a certain extent.

In the above-described embodiment, the guard value ΔKmax is variably set in response to the amount of change per unit time (the absolute value of the rate of change ΔP1) in the intake air pressure after compression P1. Instead, the guard value ΔKmax may be set to a constant. In this case as well, the coefficient K does not immediately reduce with a reduction in the amount of change per unit time in the intake air pressure after compression P1. For this reason, the computed estimated intake air temperature T1, approximated to the behavior of the actual intake air temperature T1$t$ that continues to change even after convergence of the change in the intake air pressure after compression P1, is obtained.

In the above-described embodiment, the guard process is executed. In the guard process, the amount of change per unit time in the coefficient K at the time when the coefficient K changes with a reduction in the amount of change per unit time in the intake air pressure after compression P1 is limited to the guard value ΔKmax or below. Instead, such a guard process may be not executed. The case where the guard process exhibits its advantageous effect is the case where a change in the intake air pressure after compression P1 is steeper than a certain extent. Thus, when the change does not become steep so much, it is possible to accurately estimate the intake air temperature after compression by the compressor 13 without executing the guard process.

In the above-described embodiment, the estimated intake air temperature T1 is computed by using the above mathematical expression (2) as the function that returns a first-order lag value with respect to the adiabatically compressed intake air temperature T1$m$. A function other than the above-described function may be used as such a function. For example, a function that returns the weighted moving average of the adiabatically compressed intake air temperature T1$m$ is also the function that returns a first-order lag value with respect to the adiabatically compressed intake air temperature T1$m$. In this case, instead of the coefficient K in the above-described embodiment, the coefficient that determines the followability of the estimated intake air temperature T1 to the adiabatically compressed intake air temperature T1$m$ in that function is variably set in response to the amount of change per unit time in the intake air pressure after compression P1. For example, in the case of the function that returns the weighted moving average, the coefficient K in the above-described embodiment is replaced with weight coefficients respectively assigned to a plurality of calculated values of the adiabatically compressed intake air temperature T1$m$. In this way, depending on a function used, there can be a plurality of coefficients that determine the followability of the estimated intake air temperature T1 to the adiabatically compressed intake air temperature T1$m$. Depending on a function used, a coefficient can be increased at the time of increasing the followability of the estimated intake air temperature T1. In any case, when such a coefficient is operated such that the followability of the estimated intake air temperature T1 to the adiabatically compressed intake air temperature T1$m$ at the time when the amount of change per unit time in the intake air pressure after compression P1 is large is higher than the followability of the estimated intake air temperature T1 to the adiabatically compressed intake air temperature T1$m$ at the time when the amount of change is small, it is possible to obtain the computed estimated intake air temperature T1 further approximated to the actual intake air temperature T1$t$.

What is claimed is:

1. An intake air temperature estimation system for a turbocharged engine, the turbocharged engine provided with a compressor being configured to compress intake air and supply the compressed intake air to a combustion chamber, the intake air temperature estimation system comprising
an electronic control unit configured to
i) compute an adiabatically compressed intake air temperature based on an intake air temperature before compression, an intake air pressure before compression and an intake air pressure after compression, the intake air temperature before compression being a temperature of intake air before compression by the compressor, the intake air pressure before compression being a pressure of intake air before compression by the compressor, the intake air pressure after compression being a pressure of intake air after compression by the compressor, the adiabatically compressed intake air temperature being a temperature of intake air after compression by the compressor in an adiabatic state,
ii) compute an estimated intake air temperature with the use of a function that returns a first-order lag value with respect to the adiabatically compressed intake air temperature, the estimated intake air temperature being an estimated value of the intake air temperature after compression by the compressor, and
iii) variably set a coefficient of the function such that a followability of the estimated intake air temperature to the adiabatically compressed intake air temperature at the time when an amount of change per unit time in the intake air pressure after compression is large is higher than a followability of the estimated intake air temperature to the adiabatically compressed intake air temperature at the time when the amount of change per unit time in the intake air pressure after compression is small.

2. The intake air temperature estimation system according to claim 1, wherein
the electronic control unit is configured to, when the coefficient changes with a reduction in an amount of change per unit time in the intake air pressure after compression, compute the estimated intake air temperature while executing a guard process, the guard process being a process of limiting an amount of change per unit time in the coefficient to a prescribed guard value or below.

3. The intake air temperature estimation system according to claim 2, wherein
the electronic control unit is configured to execute the guard process such that the guard value at the time when the amount of change per unit time in the intake air pressure after compression is large is smaller than the guard value at the time when the amount of change per unit time in the intake air pressure after compression is small.

4. The intake air temperature estimation system according to claim 2, wherein
the electronic control unit is configured not to execute the guard process when the adiabatically compressed intake air temperature is rising, and the electronic control unit is configured to execute the guard process only when the adiabatically compressed intake air temperature is decreasing.

5. The intake air temperature estimation system according to claim 1, wherein
the electronic control unit is configured to, when the amount of change per unit time in the intake air pressure after compression is larger than or equal to a prescribed value, variably set the coefficient in response to the amount of change per unit time in the intake air pressure after compression.

6. The intake air temperature estimation system according to claim 1, wherein
the electronic control unit is configured to compute the estimated intake air temperature by updating the estimated intake air temperature such that a relationship expressed by the following mathematical expression is satisfied, $$T1[new] = T1[old] + \frac{T1m + T1[old]}{K}$$

where $T1m$ is the adiabatically compressed intake air temperature computed by the electronic control unit, $T1[old]$ is the estimated intake air temperature before being updated, $T1[new]$ is the estimated intake air temperature after being updated, and K is a coefficient that takes a value larger than or equal to 1.

* * * * *